Dec. 1, 1953   R. HENDERSON   2,661,083
JOINT BETWEEN CHANNEL MEMBERS
Filed May 20, 1949   4 Sheets-Sheet 1
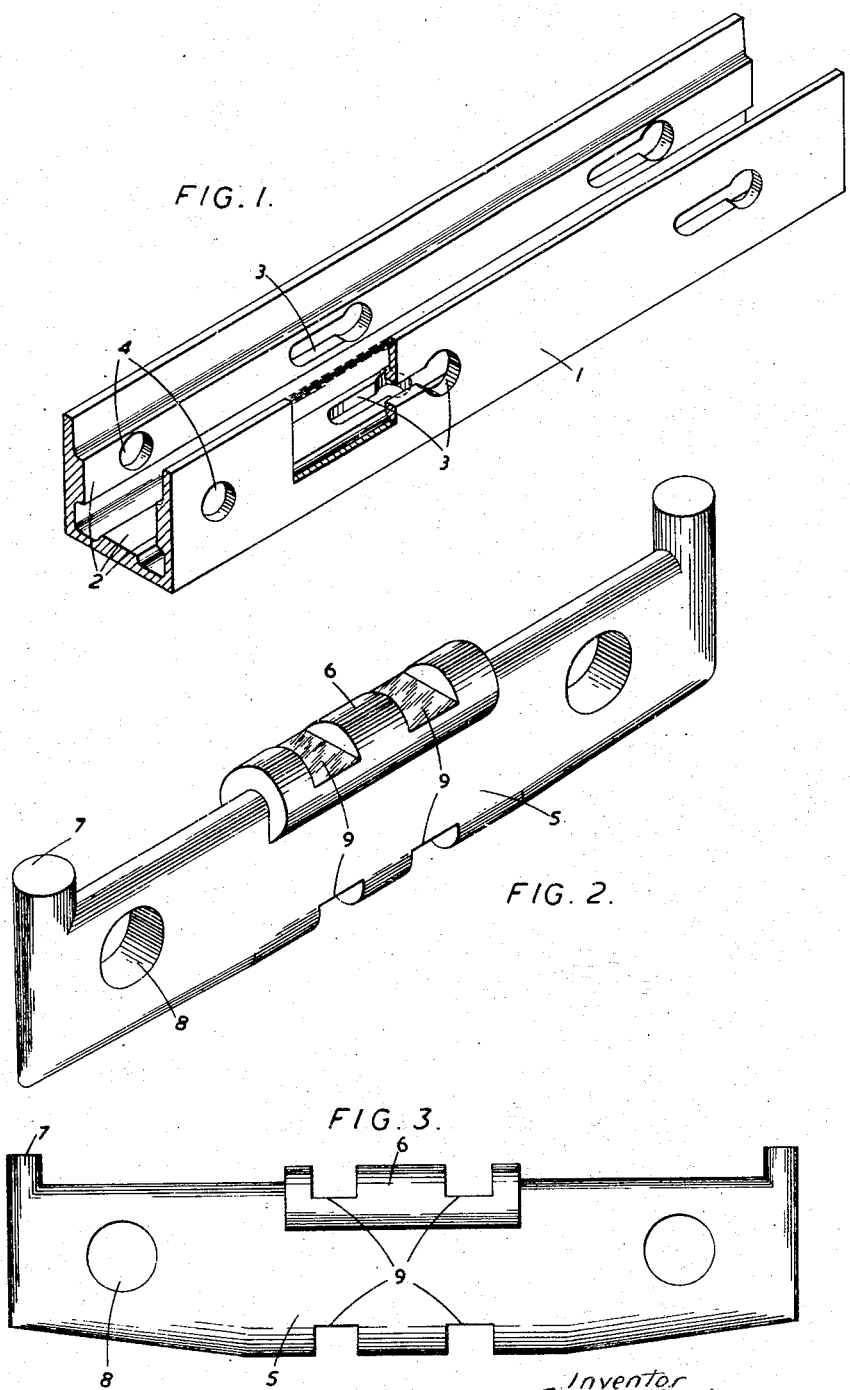

Dec. 1, 1953   R. HENDERSON   2,661,083
JOINT BETWEEN CHANNEL MEMBERS
Filed May 20, 1949   4 Sheets-Sheet 2

Inventor
Robert Henderson
By Campbell, Brumbaugh, Free + Graves
his Attorneys

Dec. 1, 1953 — R. HENDERSON — 2,661,083
JOINT BETWEEN CHANNEL MEMBERS
Filed May 20, 1949 — 4 Sheets-Sheet 3
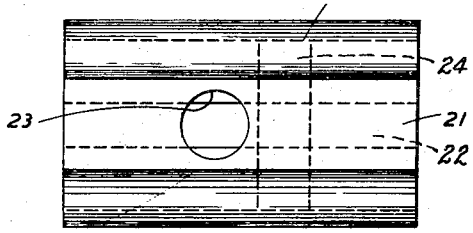
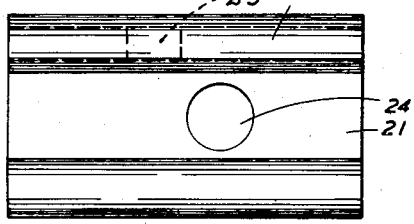
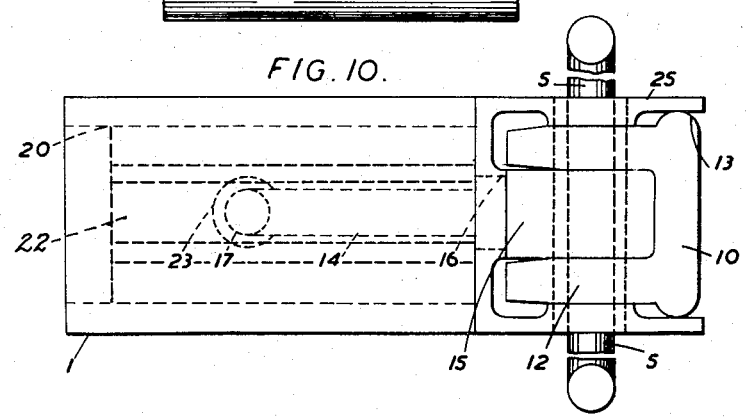
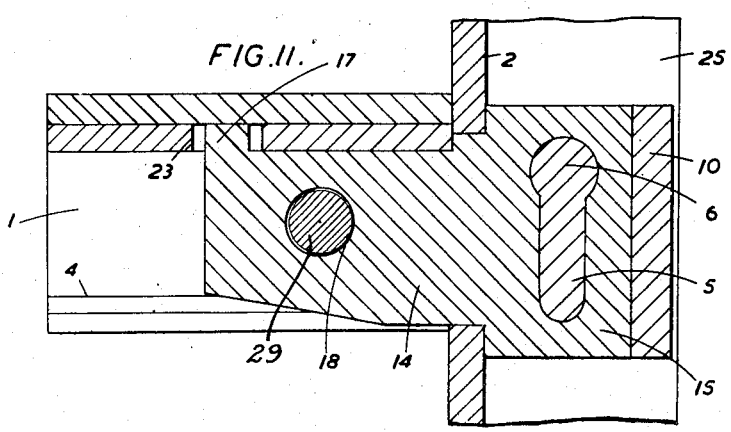
Inventor
Robert Henderson
By
his Attorneys Dec. 1, 1953   R. HENDERSON   2,661,083
JOINT BETWEEN CHANNEL MEMBERS
Filed May 20, 1949   4 Sheets-Sheet 4
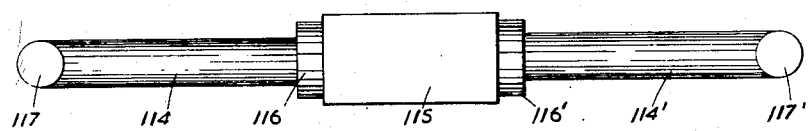
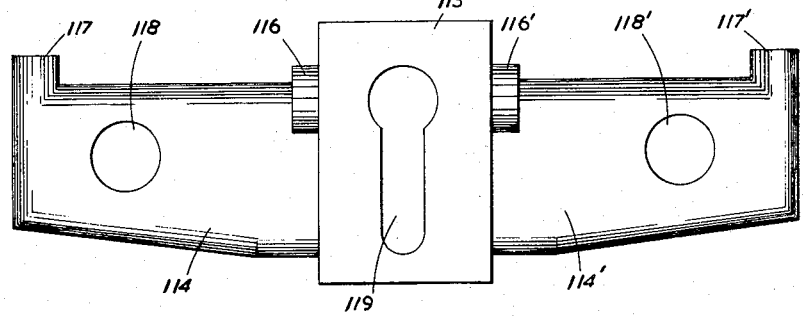
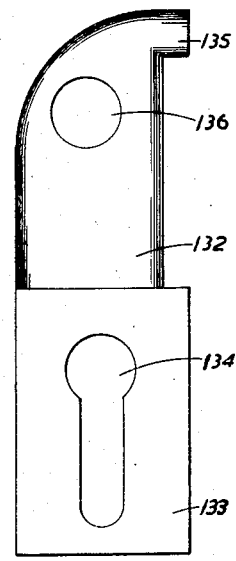
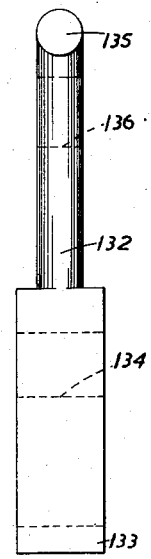
Inventor
Robert Henderson
By
Campbell, Brumbaugh, Free & Graves
his Attorneys Patented Dec. 1, 1953

2,661,083

UNITED STATES PATENT OFFICE 2,661,083

JOINT BETWEEN CHANNEL MEMBERS

Robert Henderson, Bovey Tracey, South Devon, England, assignor to Robert Building Inventions Limited, London, England, a British company Application May 20, 1949, Serial No. 94,411

Claims priority, application Great Britain May 31, 1948

13 Claims. (Cl. 189—36)

This invention relates to improvements in or relating to means for forming joints between channel members.

According to the present invention means for forming joints between channel members comprise a tongue member passing through a pair of slots in a channel member, one in each flange thereof, and within the channel member a U-section keeper with its limbs directed towards the web of the channel member, each limb of the keeper bearing against one flange of the said channel member or a reinforcement thereof and being slotted to engage in a correspondingly slotted part of the tongue member to lock the same in position, one end of the tongue member protruding through the flange of the channel member and being adapted to be received in a slotted block in the end of another channel member butting against the said flange, and the other end of the tongue member either protruding in like manner or not as desired.

Preferably the slots in the flanges are of the same key-hole shape and the tongue member is of a corresponding profile over a length equal to the spacings of the outer faces of the flanges.

According to a modification of the invention the afore-mentioned tongue member passes through a slot in a second tongue member to secure the latter within the first-mentioned channel member, the second tongue member having at least one end which protrudes through a slot in the web of the channel member or from the end of the channel member or from the open side of the channel member through a slot in the keeper and is adapted to be received in a slotted block in the end of a second channel member, and wherein each end of the first-mentioned tongue member may protrude or not as desired.

Preferably the slots in the flanges and web of the channel member are all of the same key-hole shape and a part of the second tongue member is formed as a rectangular block, one side face of which bears against the inner face of the web and the other three side faces of which are embraced by the keeper, whilst the first-mentioned tongue member passes through a key-hole slot in the said rectangular block of the same shape as and in alignment with the key-hole slots in the flanges. The said first-mentioned tongue member having a profile corresponding to that of the key-hole slots over a length equal to the spacing of the outer faces of the flanges.

When the second tongue member has an end protruding through the key-hole slot in the web of the channel member, that part of the second tongue which lies within the said slot has a profile conforming to that of the slot.

The second tongue member may alternatively or in addition have an end protruding from the open side of the channel member through a slot in the keeper of the same shape as the aforementioned key-hole slots. That part of the second tongue member which lies within the key-hole slot in the keeper having a profile conforming to that of the slot.

Preferably the channel members are of the kind described in specification No. 94,412, filed May 20, 1949, now abandoned and consist of an extruded length of metal having flat ribs extending longitudinally of the three inner faces of the channel member and integral therewith. Preferably the slotted blocks in which the tongue members are received are of the kind described in the said specification.

In order to retain the tongue member in the corresponding slotted block, the tongue member may be provided with a transverse hole adapted to receive a tapered pin driven through holes in the slotted block and the channel member containing the slotted block. Preferably the hole in the tongue member is off-set slightly towards the joint from the above-mentioned holes in the block and channel member, so that on driving in the pin the chanel members are butted tightly together.

In order to retain the tongue member in position until the pin has been driven in, it may be provided with a cranked nose engaging a recess or hole in the block. Each limb of the keeper may be slotted or cut-away to form two substantially straight fingers which are a push fit in corresponding slots in opposite sides of the tongue member. Alternatively each limb of the keeper may be slotted or cut-away to form two fingers which pass through corresponding slots in the opposite sides of the tongue member, one finger being hooked to engage over the tongue member and the other finger is curved to permit its withdrawal.

The limbs of the keeper are preferably spaced to fit between the flat reinforcing ribs on the inner faces of the flanges of the channel member, whilst the base of the keeper is enlarged to fit between the unreinforced part of the flanges adjacent the open side of the channel.

It will be seen that there are five possible positions in which additional channel members may be joined to the first-mentioned channel member, namely to the two flanges, the web and the open side of the first-mentioned channel member, and in prolongation of the first-mentioned channel member. In practice, any end of a tongue member or additional tongue member which would protrude in an unrequired position will be sawn off or omitted.

The invention may be applied with advantage in building construction for joining together lattice girders having as longitudinals the channel members described in specification No. 94,412, filed May 20, 1949, now abandoned, Some embodiments of the invention will now be described as applied to the standard section channel members described in specification No. 94,412, now abandoned, in conjunction with the coupling blocks described in the said specification, reference being had to the accompanying drawings, in which:

Fig. 1 is a perspective view on a reduced scale of a channel member,

Figs. 2 and 3 show a perspective view and side elevation of a tongue member,

Figure 4:
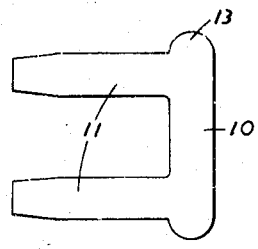
Figure 5:
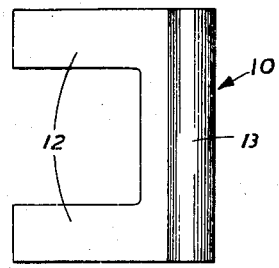
Figure 6:
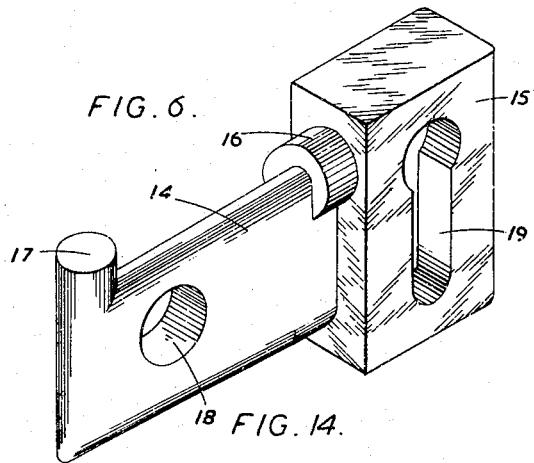
Figure 7:
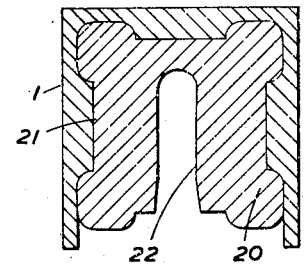
Figure 14:
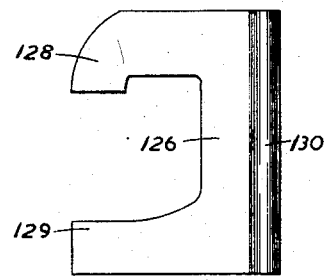
Figure 15:
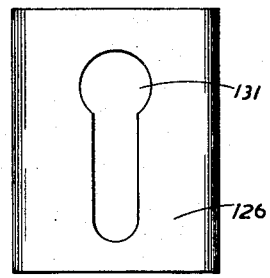
Figure 16:
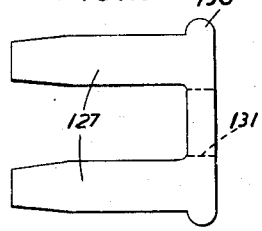

Figs. 4 and 5 show respectively a plan view and a side view of one form of keeper, Fig. 6 is a perspective view of a single-ended tongue member, Fig. 7 shows a cross-section through a channel member with a coupling block disposed therein, Figs. 8 and 9 show respectively a plan view and a side elevation of the coupling block, Fig. 10 shows a plan view of a joint formed by assembly of the parts, Fig. 11 shows a vertical longitudinal section through the joint, Figs. 12 and 13 show respectively a plan view and a side view of a double-ended tongue member, Figs. 14, 15 and 16 show respectively a side view, a rear view and a plan view of a modified form of keeper, and Figs. 17 and 18 show respectively a side view, and a front view of a modified form of a single-ended tongue member.

Referring now to Fig. 1, 1 indicates a channel member of the kind described in specification No. 94,412, consisting of an extruded length of metal having flat ribs 2 extending longitudinally of the three inner faces of the channel member and integral therewith. The channel member 1 has longitudinal key-hole slots 3 which are arranged in symmetrically disposed pairs, one in each flange, spaced at regular intervals along the length of the channel member, with corresponding slots in the web also, each disposed symmetrically between a pair of the slots in the flanges. The channel member 1 is externally square in cross section and the ribs 2 and key-hole slots 3 on all three inner faces are identical, with the ribs 2 and key-hole slots 3 being symmetrical about the plane of symmetry of the corresponding outer face of the channel member 1. Near one end the flanges may be bored through on a centre line to form holes 4, for a purpose which will later be described.

Referring now to Figs. 2 and 3, a tongue member 5 is formed as a plate of general rectangular shape with rounded corners and with the lower sides of the end portions slightly tapered toward the upper sides. The centre portion of the tongue member 5 is provided with an enlargement 6 such that the tongue member has a profile of the same key-hole shape as the key-hole slots 3 over a length equal to the spacing of the outer faces of the flanges in the channel member. The outer ends of the tongue member 5 have cranked noses formed by up-standing circular bosses 7, and the end portions of the tongue member are bored symmetrically to form holes 8 for a purpose hereafter to be described. The tongue member is provided with two pairs of slots 9 symmetrical about the mid-point of the tongue member, the spacing of the outer sides of the slots being equal to the spacing between the flange ribs 2 of the channel member 1.

Referring now to Figs. 4 and 5, a keeper 10 has limbs 11 spaced apart by a distance equal to the spacing of the inner sides of the pairs of slots 9 of the tongue member 5. The keeper 10 is formed as an extruded length of metal of substantially U-shape. Each limb of the keeper is slotted to form two fingers 12 spaced apart by a distance equal to the spacing between the bottoms of the upper and lower slots 9 of the tongue member 5. The keeper 10 is therefore of a shape to engage with its four fingers 12 as a push-fit in the four slots 9 of the tongue member 5. The keeper 10 has at each side an enlargement 13, and the width of the keeper 10, including the enlargement 13, is equal to the spacing between the inner faces of the un-reinforced portions of the flanges of the channel member 1.

Referring now to Fig. 6, a single-ended tongue member 14 is formed integral with a rectangular block 15. The width of the block 15 is equal to the spacing between the limbs 11 of the keeper 10 and the height of the block 15 is equal to the the height of the keeper 10. Where the end portion of the single ended tongue member 14 joins the block 15 it is formed with an enlarged portion 16, such that at this point the profile of the single ended tongue member is of the same key-hole shape as the key-hole slots 3 in the channel member 1, over a length equal to the thickness of the flange of the channel member 1 through the rib 2. The end of the single ended tongue member 14 has a cranked nose formed by a circular upstanding boss 17 and the tongue member is bored through with a hole 18 for a purpose hereafter to be described. The block 15 is bored through transversely on its centre line with a key-hole slot 19 of the same shape as the key-hole slot 3 of the channel member.

Referring now to Figs. 7, 8 and 9, a coupling block 20 is slideable within the channel member 1. The block 20 is square in cross-section and is provided on its bottom face, top face and two side faces with grooves 21 which are symmetrical and alike in all respects and mate with the ribs of the channel member 1. The bottom face of the coupling block is slotted lengthwise from end to end with a slot 22. The top face of the block 20 is bored through with a hole 23 extending into the slot 22. The side faces of the block 20 are bored at right angles to the plane of the slot 22 with a hole 24.

In Figs. 10 and 11, a joint is shown made up by the assembly of the above-mentioned parts. In this joint the channel member 25 which is similar in all respects to the channel member 1, constitutes the upright or post to which a boss constituted by the horizontal channel member 1 is joined. To assemble the parts the single end of the tongue member 14 is passed through a key-hole slot in the web of the channel member 25 until the block 15 of the tongue member 14 butts against the rib 2 of the web of the channel member. The key-hole slot 19 (Fig. 6) is so disposed in the block 15 that it comes into alignment with the key-hole slots in the flanges of the channel member 25. The tongue member 5 is then passed through the key-hole slots in the flanges of the channel member 25 until the outer sides of the slots 9 (Fig. 2) lie flush with the inner faces of the ribs of the flanges of the channel member 25 and the inner sides of the slots 9 lie flush with the sides of the block 15. The keeper 10 is then driven into position with the fingers 12 engaging in the slots 9 and bearing on one side against the ribs of the flanges of the channel member 25 and on the other side against the sides of the block 15. The keeper 10 is driven until the base of the keeper butts against the corresponding face of the block 15, the enlargement 13 at the sides of the base of the keeper bearing against the un-reinforced portions of the flanges of the channel member 25. In this way a completely rigid construction is obtained.

As shown in the drawings, the single end of the tongue member 14 is received in the slotted block 20 which is slideably engaged within the horizontal channel member 1. The hole 23 in the top face of the block 20 is so spaced from the end thereof that it receives the boss 17 of the single-ended tongue member 14. The hole 18 through the single-ended tongue member 14 and the hole 24 through the side faces of the block 20 are so arranged in these parts that the hole 18 is offset from the hole 24 towards the channel member 25 when the block 20 butts against the web of the channel member 1. The hole 4 (see Fig. 1) in the channel member 1 is so disposed as to be in alignment with the hole 24 in the block 20. A tapered pin 29 is then driven through the holes 4, 24, 18 and urges the block 20 and channel member 1 tightly against the web of the channel member 25.

Further horizontal channel members may be secured in precisely the same manner to either or both the projecting ends of the tongue member 5. When it is not desired to attach either or both of these additional horizontal channel members, the corresponding end or ends of the tongue member 5 may be sawn off or omitted.

When it is desired to secure horizontal channel members to one or both flanges of the channel member 25, but not to the web of the channel member 25, the tongue member 14 may be omitted wholly. Even when the tongue member 14 is omitted wholly, the tongue member 5 is held rigidly by the engagement of the fingers 12 of the keeper 10 in the slots 9 (Fig. 2) of the tongue member, and by the fit of the enlargement 6 (Fig. 2) in the key-hole slots of the flange of the channel member 25.

Referring now to Figs. 12 and 13, a double ended tongue member is shown as a modification of the single-ended tongue member shown in Fig. 6. It will be seen that the central block 115 and all the parts 114, 116 and 117 to the left-hand side of Figs. 12 and 13 are identical with the parts 14, 16 and 17, shown in Fig. 6. The double-ended tongue member is provided with a second set of like parts to the right-hand side of Figs. 12 and 13, namely a second end 114' having an enlargement 116', a cranked nose or boss 117' and a hole 118' symmetrically arranged with respect to the parts shown on the left-hand side of the figures.

Referring now to Figs. 14, 15 and 16, there is shown a keeper 126 which is a modification of the keeper shown in Figs. 4 and 5, having the same overall dimensions. The limbs 127 of the keeper 126 are slotted to form a hooked upper finger 128 and a curved lower finger 129. The keeper has side enlargements 130 and a key-hole slot 131 formed in the base.

The double-ended tongue member just described and the keeper 126, may be substituted for the single-ended tongue member 14 and the keeper 10 in the joint shown in Figs. 10 and 11 of the drawings. The joint is assembled as before, the hooked fingers 128 engaging over the tongue member 5, and the end portion 114' of the double ended tongue member protruding from the open side of the upright channel member 25 through the key-hole slot 131 in the keeper 126. A further horizontal channel member may be then joined onto the end portion 114' of the additional tongue member, in the same way as already described with reference to the horizontal channel member 1.

In the construction shown in Figs. 10 and 11 the modified keeper 126 may be substituted for the keeper 10 without any other change in the parts shown in Figs. 10 and 11, and if desired the key-hole slot 131 (Figs. 15 and 16) in the base of the keeper 126 may then be omitted.

Figs. 17 and 18 show a modified form of single-ended tongue member 132 in which the single end projects upwards from a block 133, which is of the same dimensions as the block 15 of Fig. 6, and is provided with a key-hole slot 134 like to the key-hole slot 19 of Fig. 6. The single end of the tongue member 132 is provided with a cranked nose or boss 135 and a hole 136 as before.

In a modification of the construction shown in Figs. 10 and 11, the horizontal channel member 1 is omitted, the upright channel member 25 terminates slightly above the level of the keeper 10, and the tongue member 14 is replaced by the modified tongue member 132. A second upright channel member may then be joined by means of the additional tongue member 132 to the end of the upright channel member 25 in prolongation thereof. The upstanding end portion of the additional tongue member 132 engaging in a block in the further channel member, in the same way as the end portion of the additional tongue member 14 is shown in Figs. 10 and 11 as engaging in a block 20 in the horizontal channel member 1.

What I claim is:

1. A coupling comprising a first channel member having opposite side flanges, a back web and an open opposite side, said side flanges having aligned openings therein, a second channel member, a tongue member extending through said openings, said tongue member having recesses therein disposed between said side flanges, a keeper having a base fitting between the side flanges and legs thereon extending toward said back web, engaging the recesses in said tongue member and retaining it against endwise movement, an extension having an angularly related projection thereon mounted on said tongue member and projecting therefrom to the outside of said first channel member, a slotted block in said second channel member receiving said extension and projection, and means securing the slotted block to said second channel member and to said extension.

2. The coupling set forth in claim 1 wherein the means securing the slotted block to the second channel member and the extension comprises apertures through said extension, said second channel member and said slotted block, and a member extending through said apertures and securing said extension, said second channel member and said slotted block together.

3. The coupling set forth in claim 1 in which the web of said first channel member has an opening therethrough and the extension projects at right angles to the tongue member through the last-mentioned opening.

4. The coupling set forth in claim 1 in which said extension has an end portion provided with an aperture through which said tongue member extends.

5. A coupling comprising a first channel member having opposite side flanges, a back web and an open opposite side, said side flanges having aligned openings therein, a second channel member, a tongue member extending through said aligned openings and having notches therein between said side flanges, a keeper having a U-shaped cross section and having spaced apart legs, said keeper being mounted within said first channel member with each leg bearing against a flange of said first channel member and directed toward the web of said first channel member, each of said legs being bifurcated and engaging in said notches in said tongue member, another member in said first channel member having an opening receiving said tongue member and a projecting portion, a slotted block in said second channel member engaging said projecting portion, and means securing the slotted block to said second channel member and said projecting portion.

6. A coupling comprising a first channel member having opposite side flanges, a back web and an open opposite side, said side flanges having aligned openings therein, a tongue member extending through said openings, said tongue member having a first portion extending between and through said side flanges, another portion projecting outwardly beyond one of said side flanges and a projection on said another portion extending at an angle thereto, said first portion of said tongue member having recesses therein disposed between said side flanges, a keeper having a base fitting between said side flanges and legs thereon extending toward said back web, engaging in said recesses and retaining said tongue member against endwise movement, a second channel member, a slotted block in said second channel member receiving said another portion and said projection thereon and being retained thereby against movement endwise of said another portion, and means securing said slotted block to said second channel member and to said tongue member.

7. In a structural unit, the sub-combination of an extruded metal channel member having flat ribs formed on the three inner faces of the channel member and integral therewith, and a coupling block slideably engaged within said channel member, the side faces of said coupling block having grooves therein mating with any of the ribs of said channel member.

8. In a structural unit, the sub-combination of an extruded metal channel member having flat ribs formed on the three inner faces of the channel member and integral therewith, and a coupling block slideably engaged within said channel member, the side faces of said coupling block having grooves therein mating with any of the ribs of said channel member, one side face of said coupling block being slotted lengthwise from end to end.

9. In a structural unit, the sub-combination of an extruded metal channel member having flat ribs formed on the three inner faces of the channel member and integral therewith, a coupling block slideably engaged within said channel member, the side faces of said coupling block having grooves therein mating with any of said ribs, a slot extending through one side face of said block from end to end of said block, and a bore entering said slot through the side face of said block opposite said first-mentioned side face.

10. In a structural unit, the sub-combination of an extruded metal channel member having flat ribs formed on the three inner faces of the channel member and integral therewith, a coupling block having grooves therein mating with said ribs and slideably engaged within said channel member with the end of said block flush with the end of said channel member, a slot extending through one side face of said block from end to end, and a bore passing through said channel member and said block at right angles to the plane of said slot.

11. In a structural unit, the sub-combination of a metal channel member having a web and a pair of flanges at the edges of said web, flat topped longitudinally extending ribs formed integrally with said web and flanges and having pairs of symmetrically disposed longitudinal slots, one in each flange, spaced along the length of the channel member, each said slot entering the interior of the channel member through one of the said ribs; and a coupling block slideably engaged within the said channel member, said block being substantially square in cross-section and having in each of its four sides longitudinal grooves symmetrically arranged and like in all respects, said block also having a slot extending through one of said four sides from end to end thereof.

12. In a structural unit, the sub-combination of a metal channel member having a web and a pair of side flanges, flat ribs formed integrally with, and extending longitudinally of, the inner faces of said web and flanges and having a plurality of sets of three longitudinally extending slotted apertures regularly spaced along the length of the channel member, the apertures in each set being arranged symmetrically with each other one in each of the said longitudinal ribs; and a metal coupling block slideably engaged within the said channel member, said block being substantially square in cross-section and having, mating with the said longitudinal ribs, longitudinal grooves in its four sides symmetrically arranged and like in all respects, said block also having one side slotted lengthwise from end to end.

13. In a structural unit, the sub-combination of an extruded metal channel member having a web and two flanges in perpendicular relation to said web, the three inner faces of said web and flanges having flat longitudinal ribs, and apertures spaced along the length of said ribs; and a coupling block of substantially square cross-section slideably engaged within the said channel member, the said coupling block having a longitudinal groove in each of its four side faces mating with any of said longitudinal ribs, said block also having a slot extending through one side face from end to end, and a bore entering the said slot through the side face opposite the said slotted side face.

ROBERT HENDERSON.

References Cited in the file of this patent

UNITED STATES PATENTS

| Number | Name | Date |
|---|---|---|
| 922,919 | Lawrence | May 25, 1909 |
| 1,021,185 | Foster | Mar. 26, 1912 |

FOREIGN PATENTS

| Number | Country | Date |
|---|---|---|
| 705,640 | Germany | May 5, 1941 |